United States Patent [19]
Phillips

[11] 3,740,708
[45] June 19, 1973

[54] SEISMIC PNEUMATIC ENERGY SOURCE WITH BUBBLE ELIMINATOR AND SIGNAL OSCILLATION ATTENUATOR

[75] Inventor: William E. Phillips, Houston, Tex.

[73] Assignee: Texaco, Inc., New York, N.Y.

[22] Filed: Dec. 27, 1971

[21] Appl. No.: 212,266

[52] U.S. Cl. .................... 340/12, 181/0.5 R, 340/8
[51] Int. Cl. .......................................... H04b 13/02
[58] Field of Search ................... 340/8, 12, 14, 85; 181/0.5 R, 0.5 AG, 0.5 H

[56] References Cited
UNITED STATES PATENTS

| | | | |
|---|---|---|---|
| 3,143,999 | 8/1964 | Bouyoucos | 340/8 R |
| 2,787,671 | 4/1957 | Grosskopf et al. | 340/8 PC |
| 3,433,202 | 3/1969 | Sharp et al. | 340/8 R |
| 3,276,534 | 10/1966 | Ewing et al. | 181/0.5 H |
| 2,616,984 | 11/1952 | Pare | 340/12 R |
| 3,379,272 | 4/1968 | Brooks | 340/12 R |

Primary Examiner—Benjamin A. Borchelt
Assistant Examiner—H. J. Tudor
Attorney—Thomas H. Whaley and Carl G. Ries

[57] ABSTRACT

A first chamber having a flexible outer wall for receiving expanding gas from a seismic pneumatic energy source for being inflated has a second chamber connected thereto for receiving the expanding gas from the first chamber, and alternatively, a vent to the atmosphere attached to the second chamber for containing all gas from the pneumatic source for eliminating the usual air bubble when activated underwater and for attenuating subsequent signal secondary oscillation after the desired initial acoustical signal pulse.

19 Claims, 6 Drawing Figures

Patented June 19, 1973 3,740,708

SEISMIC PNEUMATIC ENERGY SOURCE WITH BUBBLE ELIMINATOR AND SIGNAL OSCILLATION ATTENUATOR

BACKGROUND OF THE INVENTION

Broadly the present invention relates to seismic exploration and to an improved pneumatic marine seismic source for the introduction of seismic energy into water from a floating vessel for supplying compressed air and having a geophysical crew thereon for exploring earth layers and formations underlying bodies of water as oceans, seas, lakes, rivers, or the like. More particularly this invention pertains to a seismic pneumatic energy source with an attenuator for eliminating the usual bubble underwater and for attenuating the subsequent signal secondary oscillations.

Seismic surveys which are conducted over water covered areas use various methods as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In all methods utilized, it is customary to tow a one or more detectors through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous, which the explosions themselves tend to kill marine life. Also, in the case of dynamite two separate vessels are required; one for handling the dynamite and the other for the recording equipment. This, of course, increases the cost of the survey. The use of explosive gas mixture solves some of the problems that arise with dynamite, since explosive gas mixtures do not kill as much marine life. Normally, gas mixtures can be stored as separate, non-explosive gases on the same vessel that contains the recording equipment. Thus, the need for an additional vessel or the possibility of killing marine life is eliminated. The one disadvantage of gas type sound sources is the relatively short life of the flexible container or sleeve in which the explosive gas mixtures are detonated. Conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3-5 percent of the total electrical energy available in the capacitor bank is converted to useful acoustical energy in the water. Further, many spark electrodes in parallel may be used simultaneously as disclosed in U.S. Pat. No 3,613,823.

However, a problem that most of the seismic systems have, including the above, is the oscillation or pulsation following the desired initial acoustical signal pulse.

Known methods to attenuate the pulsation of this bubble consists in using a metallic sphere which is provided with a plurality of holes regularly distributed on its wall and in which the explosion is carried out, this sphere being made of a material which can withstand the explosion. It is, however, difficult to build such spheres having a sufficient mechanical strength to withstand numerous repeated explosions. Another known device comprises a container with a resilient opening and closing element which provides an intermittent connection of the interior of the container with the surrounding liquid medium as disclosed in U.S. Pat. No. 3,444,953. None of the above systems attenuate the pulsation or oscillations to any great extent due to the bubble produced, regardless of the size thereof.

OBJECTS OF THE INVENTION

Accordingly, a primary object of this invention is to eliminate the bubble and its effect in underwater sudden release of seismic impulse or wave energy or from an underwater explosion.

Another primary object of this invention is to attenuate subsequent signals or oscillations following the desired initial acoustical signal from a seismic energy source.

Another object of this invention is to improve the use of air guns underwater or in any other fluid medium for the generation of strong, well-defined acoustical waves with the elimination of the bubble and its accompanying oscillations.

A further object of this invention is to provide a seismic pneumatic energy source with bubble eliminator and signal oscillation attenuator that is easy to operate, is of simple configuration, is economical to build and assemble, and is of greater efficiency for the elimination of the bubble underwater and for the attenuation of subsequent signal pulsation or oscillation.

Other objects and various advantages of the disclosed seismic pneumatic energy source with bubble eliminator and signal oscillation attenuator will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, two forms of the invention wherein, like reference numerals designate corresponding parts in the several views in which.

DESCRIPTION OF THE PREFERRED EMBODIMENTS

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

Figure 1:
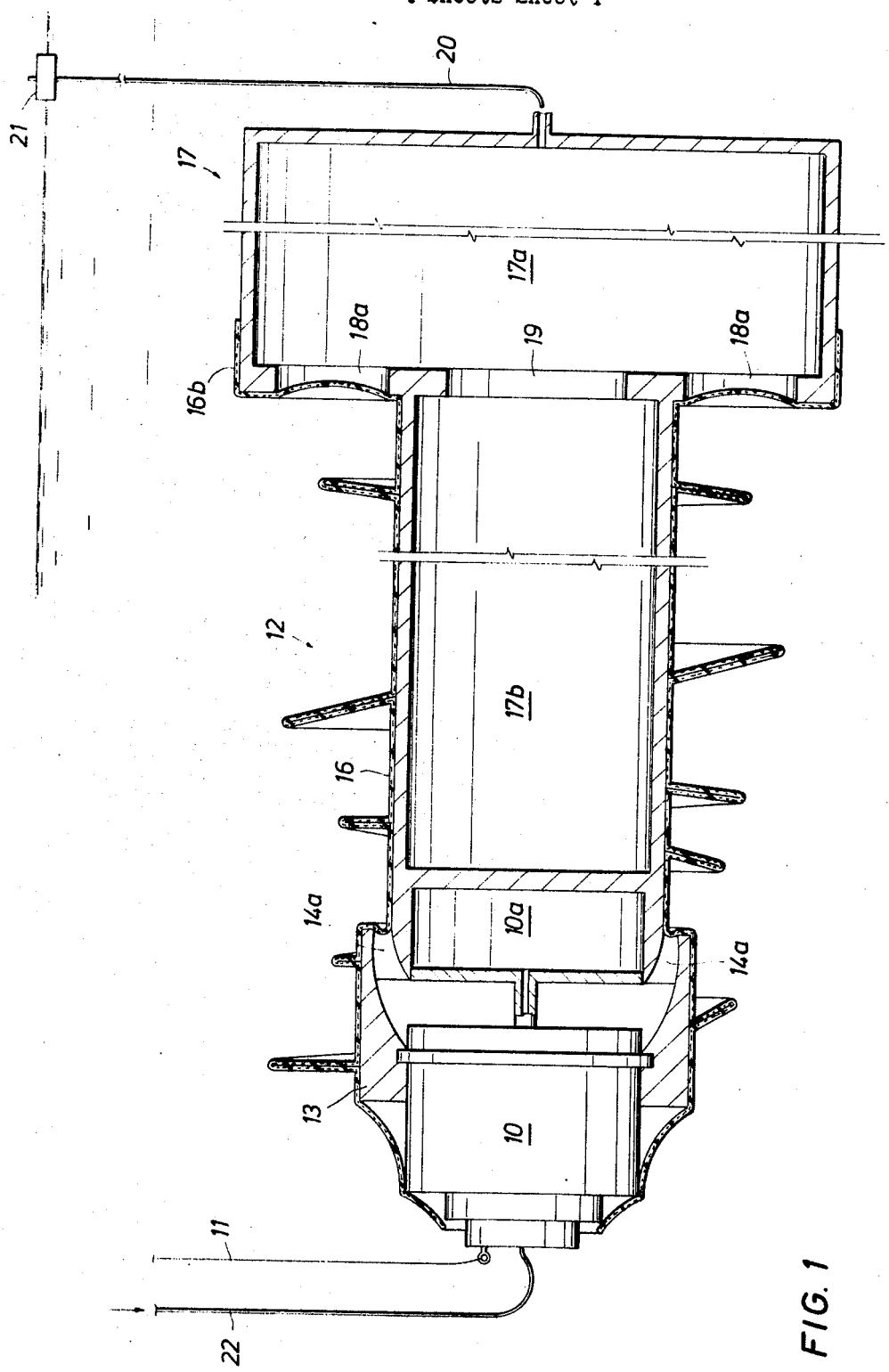
FIG. 1 is a schematic sectional view of a seismic air gun having attached thereto a pulsation attenuator, a portion thereof illustrated in collapsed condition prior to firing.

FIG. 1 illustrates a seismic energy source or sound source 10 of the invention for being towed underwater by a tow line 11 along with detectors (not shown) on the surface of the water in seismic surveys of water covered areas and a pulsation attenuator 12. While various explosives, sparks, etc. may be utilized, the preferred sound source 10 comprises a conventional air gun such as but not limited to Model 1500 air gun manufactured by Bolt Associates Inc., Norwalk, Connecticut, whereby the seismic impulse is caused by the wave energy propagated in a radial direction outwardly from the air gun and a first annular chamber described hereinafter. The attenuator 12 eliminates the release of an air bubble and attenuates the subsequent signal pulsation or oscillation following the initial acoustical signal pulse.

With the air gun 10 mounted on the fore portion of a housing 13 having a plurality of deflector nozzles 14a for expelling the compressed air from the air gun rearwardly, a first chamber 15 of the attenuator 12 is connected to the rear of the housing and likewise to the rear of the air gun piston and cylinder portion 10a. This first chamber 15, particularly as shown in FIG. 2, annular in shape, has a non-stretchable, flexible outer wall 16 attached at its forward end 16a to the housing 13 and at its rearward end 16b to a second chamber 17.

This first chamber 15, FIG. 1, being an annulus with a flexible outer wall 16, the plurality of nozzles 14a from the housing 13 project rearwardly to form openings in the front wall of the annulus and the rear of the annulus has a plurality of openings or ducts, as 18a to the second chamber 17. Both of these forward and rearward openings are closed by the flexible outer wall 16 when collapsed and inactive, FIG. 1. The second chamber 17 comprises an aft large cylindrical portion 17a that has the openings 18a, from the annular first chamber and a smaller forward cylindrical portion 17b filling the center opening of the annulus. This forward and smaller portion 17b of the second chamber 17 has a front end closed by the air gun cylinder portion 10a and the rear end opened with a large opening 19 communicating with the forward portion of the larger cylindrical rearward portion 17a of the second chamber 17. Connected to the aft end of the second chamber 17a is an opening 20a and passage or vent 20 to the surface of the water wherein a float 21, or the like, maintains the end of the passage vented to the atmosphere wherein this passage maintains the second chamber 17, and likewise the first chamber 15, vented to the atmosphere at all times. A suitable high pressure air line 22 supplies the air gun 10. The diaphragm material of flexible wall 16 may be reinforced "Buna N" rubber.

Figure 2:
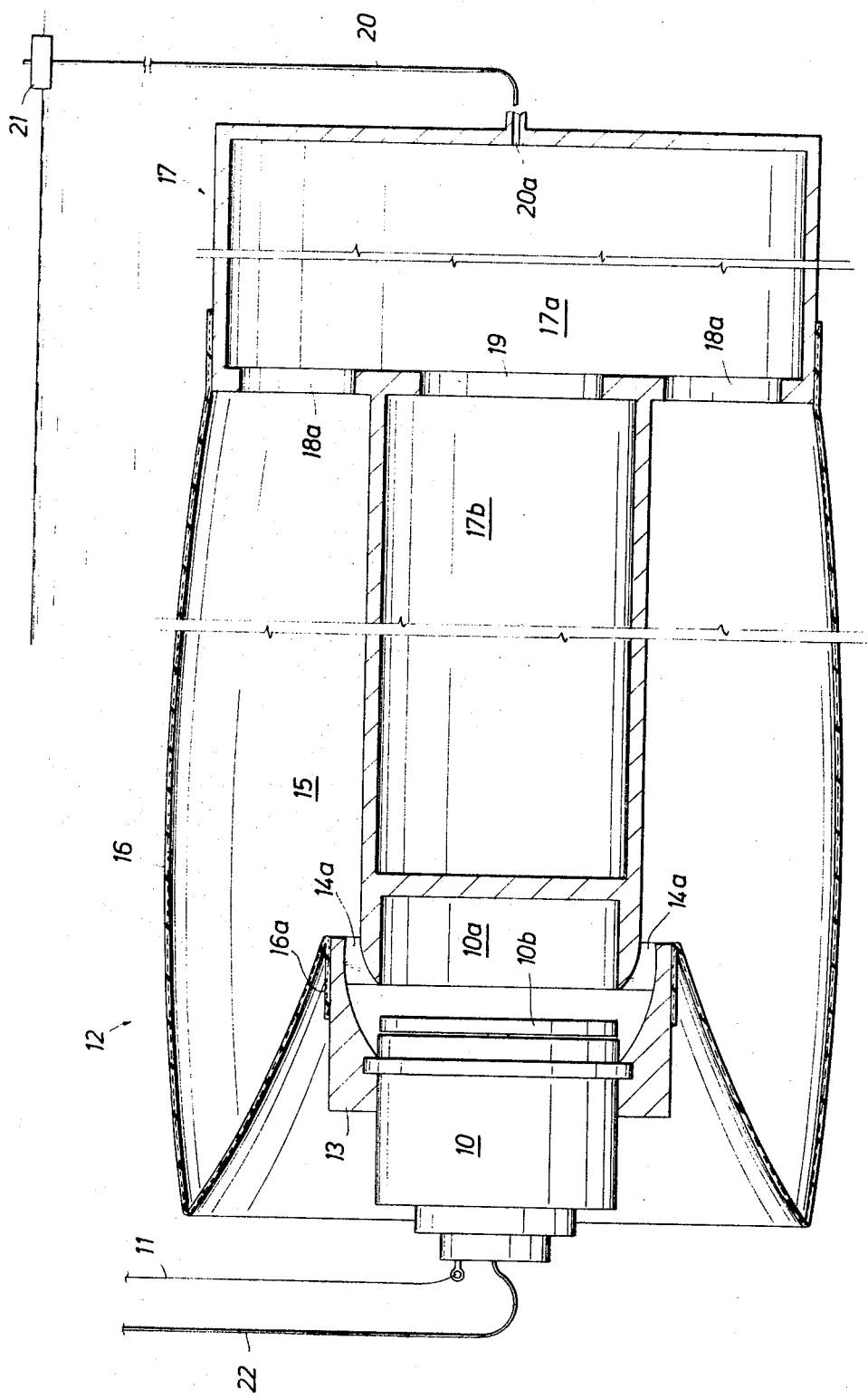
FIG. 2 is a schematic view of the device of FIG. 1 shown in inflated condition immediately after firing.

FIG. 2 illustrates the attenuator 12 in the inflated conditions wherein the air gun 10 has just fired and the charge of expanding air has filled the annular first chamber 15. This is the position of the flexible wall 16 and first chamber immediately after the first or initial acoustical signal pulse has been generated by air gun 10. Then the expanding air filling the annular first chamber 15 flows rearwardly through ducts 18a into the large cylindrical rearward portion 17a of the second chamber 17. From there the air flows and expands into the forward cylindrical portion 17b of the second chamber 17. As the air moves due to its expanding into this space and also due to the pressure of the water trying to collapse the flexible wall 16 of the first chamber, the air from chamber 15 fills chamber 17, the two chambers being of substantially equal volume. Further, to make room for a second and subsequent charge of air, the pressure in the chambers 15 and 17 must be lowered to a pressure equal to or lower than the pressure of the static head of water at the particular depth of operation. Vent 20a with line 20 to the atmosphere is provided at all times. A vacuum pump (not shown) may be substituted for the atmospheric vent for even greater efficiency.

In operation of the embodiment of FIGS. 1 and 2, after the air gun 10 is fired, i.e., the air gun cylinder 10a is opened instantaneously by the air gun piston 10b moving forward rapidly, the expanding air rushes out the rearward openings of the housing into the first chamber 15, FIGS. 1 or 2, for expanding and inflating this chamber and moving the flexible outer wall outwardly to the position shown in FIG. 2. As the air continues to expand and as the water pressure overcomes the internal pressure of the air on the flexible wall, this wall will then gradually move to the collapsed position. Simultaneously the expanding air passes out the rearward end of the first chamber into the large cylindrical portion 17a of the rearward end of the second chamber from whence the air moves both into the forward portion 17b of the second chamber and out the vent 20 to the atmosphere. This attenuator in effect contains the bubble of air and prevents the forming of a bubble outside of the air gun which would be free to float in the water and free to oscillate or pulsate, that is to first expand until the hydrostatic pressure externally of the bubble in the water finally overcomes the momentum of the outwardly flowing water and the bubble begins to contract until the pressure in the bubble becomes so great that it overcomes the hydrostatic pressure and momentum of the water and expands back out again. This expanding and contraction of the free bubble in the water causes the subsequent signal pulsation or oscillation and the detrimental pulses of sound therefrom which are most annoying and detrimental to the receipt of intelligible data from seismic recorders.

Figure 3:
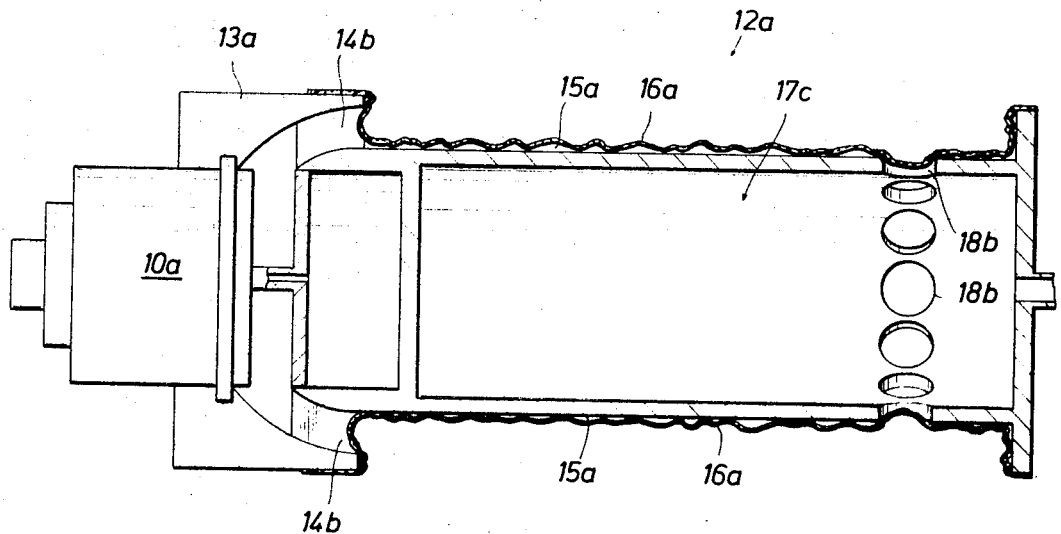
FIG. 3 is a schematic view of a modified attenuator in a collapsed condition in readiness for operation.
Figure 4:
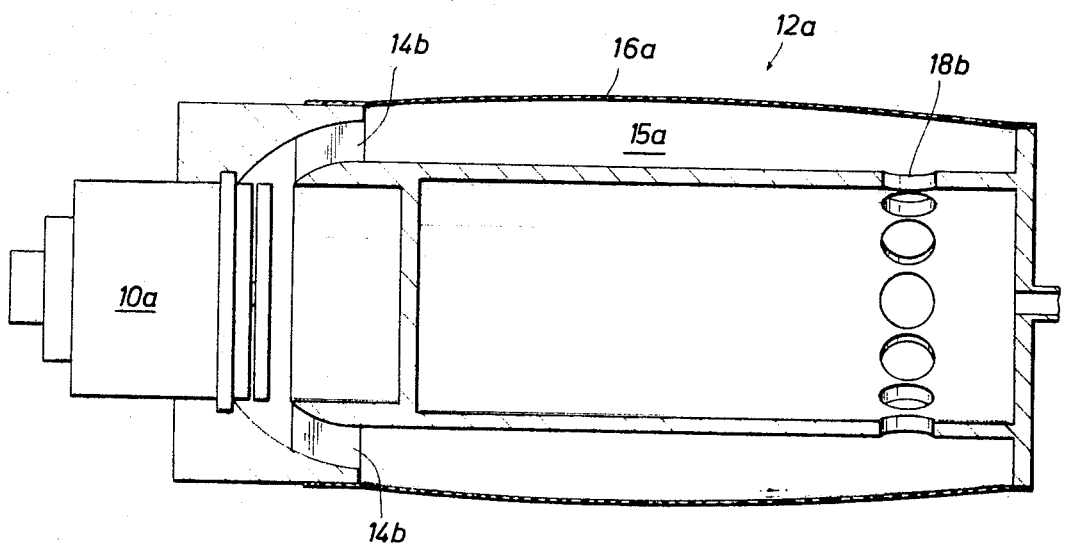
FIG. 4 is a schematic view of the device of FIG. 3 in inflated condition.

FIGS. 3 and 4 illustrate a second embodiment of the attenuator 12a wherein in FIG. 3 a conventional air gun 10a is shown in position ready to fire wherein the air gun is attached to the forward end of the housing 13a and a rigid cylindrical chamber 17c is connected to the rear of the housing and the air gun. A first chamber 15a with a flexible outer wall 16a is formed in the shape of an annulus for receiving the charge from the air gun 10a via housing nozzles 14b. This annular chamber is thinner, more elongated relative to that of the first modification and more streamlined. The second and rigid chamber 17c forms the inner portion of the annulus formed by the first chamber 15a. Likewise openings 18b are formed in the inner rearward portion of the inner wall of the first chamber whereby air in the first annular chamber passes into the cylindrical second chamber before continuing rearwardly out of the vent line to the atmosphere.

The significance of the attenuation of the secondary oscillation is illustrated in Table I below.

TABLE I

First Run

| System | Oscillation or Pulsation Amplitudes Relative to "A" in db | | | | |
|---|---|---|---|---|---|
| | A | B1 | B2 | B3 | B4 | B5 |
| No attenuator | a #4873 | −3.97 | −13.01 | −17.65 | −18.83 | −21.22 |
| With attenuator | a #2203 | −11.20 | −20.00 | −33.79 | | |
| db difference | −6.73 | −7.23 | −6.99 | −16.14 | | | a Primary pulse amplitude (arbitrary numbers).

SECOND RUN

| No attenuator | #28 | −2. | −11. | −23. |
|---|---|---|---|---|
| With attenuator | #14 | −13. | −29. | |
| d b Difference | −6. | −11. | −18. | |

This table comprises two different runs wherein the primary pulse is recorded under column "A" as an arbitrary number in each shot or each of the two runs, both for the air gun with "no attenuator" and again for the air gun "with attenuator." The peak-to-peak amplitude in d b (decibels) for each cycle of the secondary oscillation following the primary pulse in each shot of each run is recorded as B1, B2, B3, B4, and B5 relative to that of the initial or primary pulse. Further, the bottom line of each run shows the difference in d b due to the attenuator for each of the runs.

Figure 5:
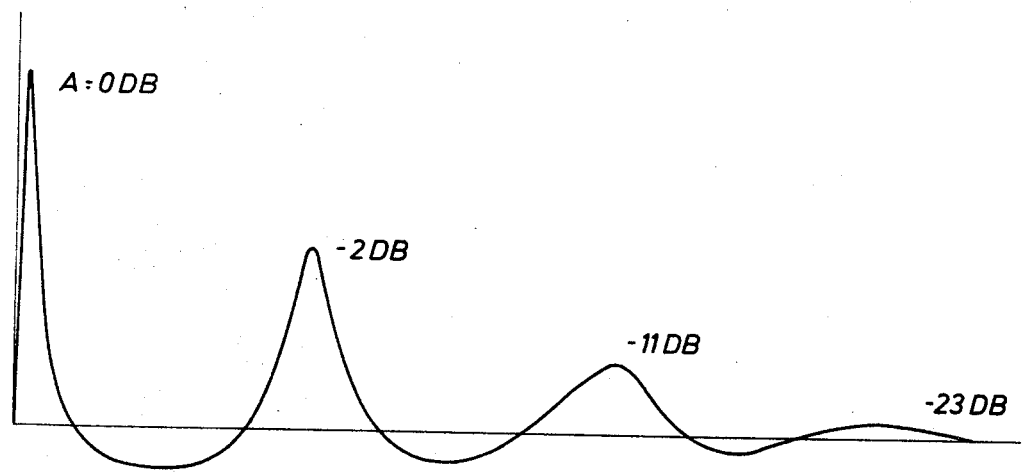
FIG. 5 is the curve resulting from an underwater seismic test firing of an air gun without the disclosed attenuator showing the pulsation or oscillation following the initial acoustical signal pulse in decibels.
Figure 6:
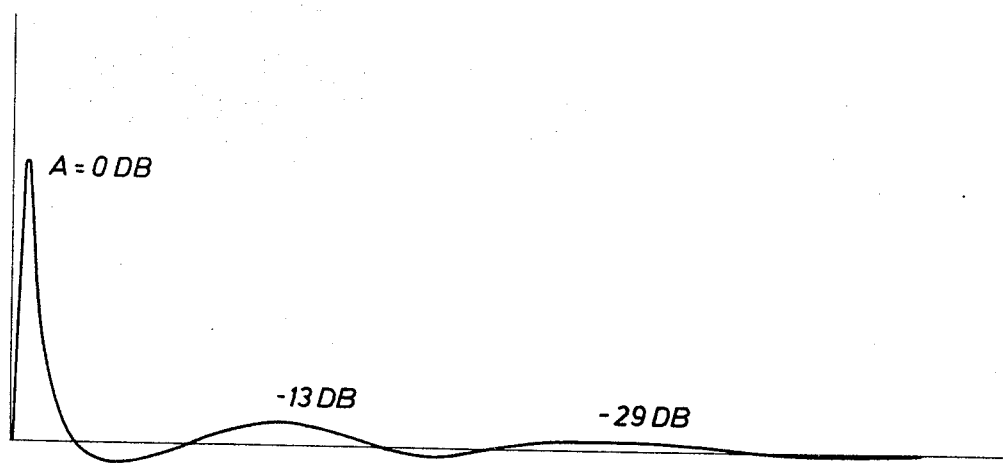
FIG. 6 is a curve or trace resulting from an underwater seismic test firing of the air gun of FIG. 5 with the disclosed attenuator illustrating the attenuation of the pulsation or oscillation after the initial acoustical signal pulse in decibels.
Figure 4:
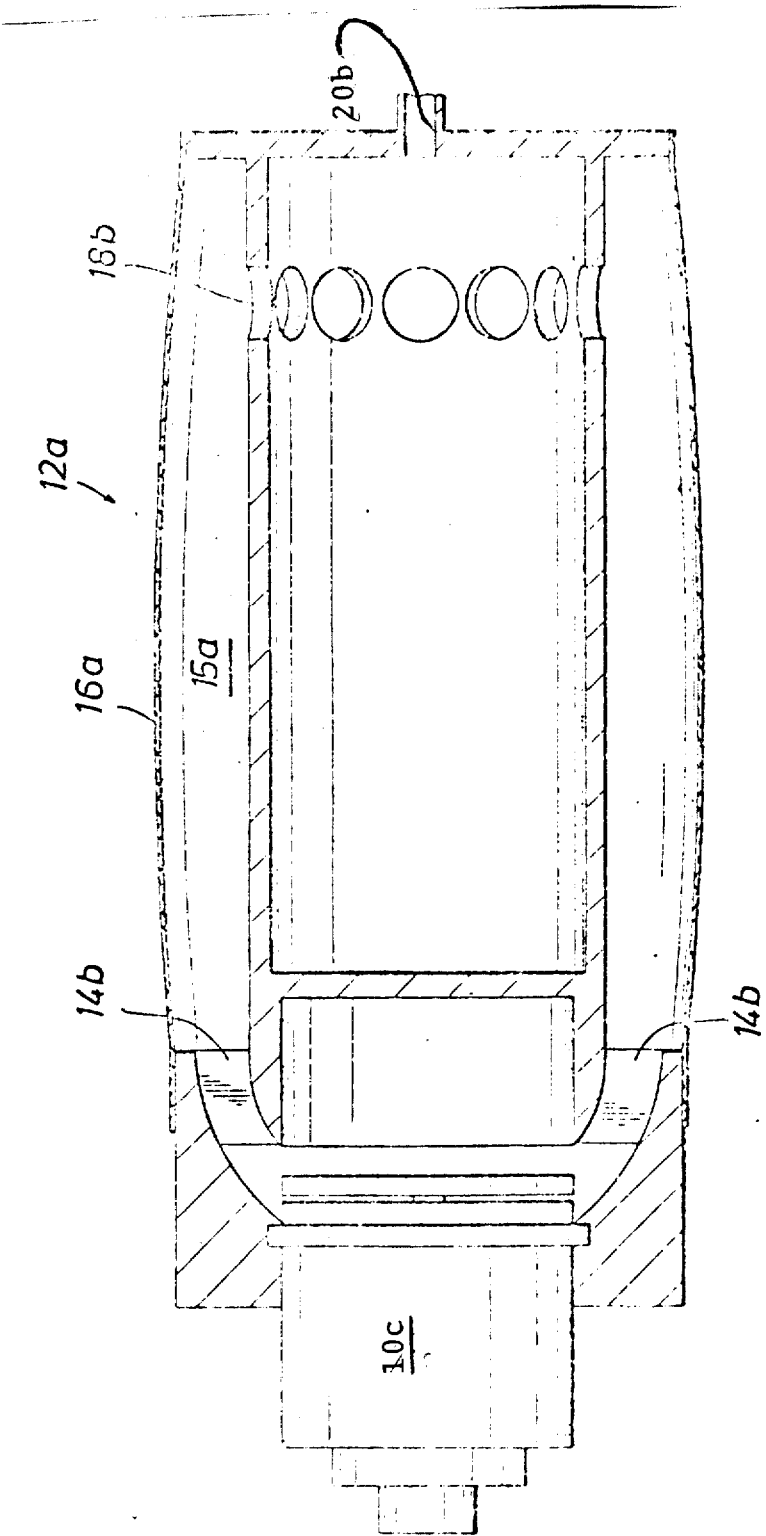

FIGS. 5 and 6 illustrate the resultant traces of another run wherein the cartesian coordinates comprise the amplitude of the seismic pulse as the ordinate and the distance between pulses at the abscissa.

FIG. 5 illustrates normal pulsation following the primary pulse from the firing of an air gun underwater in a seismic survey with no attenuator on the air gun.

FIG. 6 illustrates the attenuated secondary oscillation of the pulses following the firing of the air gun with the new attenuator mounted thereon.

In operation of the embodiment of FIGS. 3 and 4, the gun is fired, i.e., the highly compressed air is released suddenly and passes out openings or nozzles 14b into the annular first chamber 15b to thereby inflate the first chamber to the position illustrated in FIG. 4. As expanding air inflates this annular chamber the air continues through the annular chamber to pass through the openings 18b into the elongated second chamber 17c whence the air passes out of the vent tube to the atmosphere thereby attenuating any and all subsequent secondary oscillations following the initial desired acoustical signal pulse.

Thus accordingly, it will be seen that the present seismic pneumatic energy source with a bubble eliminator and signal oscillation attenuator operates in a manner which meets each of the objects set forth hereinbefore.

While only two embodiments of the invention have been disclosed, it will be evident that various other modifications are possible in the arrangement and construction of the disclosed seismic energy source with bubble eliminator and signal oscillation attenuator without departing from the scope of the invention, and it is accordingly desired to comprehend within the purview of this invention such modifications as may be considered to fall within the scope of the appended claims.

I claim:

1. For a seismic energy source means for generating an initial desired acoustical signal pulse, an attenuator of subsequent signal pulsation or oscillation comprising,
   a. first chamber means having a cylindrical flexible wall means overlying an inner cylindrical fixed wall means for forming an annular chamber around said inner cylindrical fixed wall means for receiving expanding gas from said seismic energy source means for being inflated, and
   b. second chamber means having a cylindrical fixed wall means integral with said inner cylindrical fixed wall means of said first chamber means for receiving said expanding gas from said first chamber means for attenuating subsequent signal pulsation or oscillation.

2. An attenuator as recited in claim 1 wherein,
   a. said first and second chamber means are responsive to said flexible wall means for attenuating subsequent signal pulsation following said initial acoustical signal pulse.

3. An attenuator as recited in claim 1 when operated underwater wherein,
   a. said first and second chamber means are responsive to said flexible wall means for preventing a free oscillating, pulsating bubble to form in the water by containing all of the expelled gas from the seismic energy source means.

4. An attenuator as recited in claim 1 wherein,
   a. said first chamber means is responsive to said expanding gas from said seismic energy source means for radiating the initial desired acoustical signal pulse, and
   b. both said interconnected chamber means being responsive to the flow of the expanding gas therethrough for attenuating subsequent signal pulsation.

5. An attenuator as recited in claim 1 wherein,
   a. said seismic energy source means is an air gun for generating the initial desired acoustical signal pulse.

6. An attenuator as recited in claim 1 wherein,
   a. said first chamber means comprises an annulus around at least a portion of said seismic energy source means.

7. An attenuator as recited in claim 1 wherein,
   a. said second chamber means has a vent passage to the atmosphere for lowering the air pressure in both chambers to approach atmospheric pressure for additional attenuation of the initial signal pulsation or oscillation.

8. An attenuator as recited in claim 1 wherein,
   a. said second chamber means comprises an elongated cylindrical portion, and
   b. said first chamber means comprises an annular chamber around said cylindrical portion, and
   c. passage means interconnecting said two chamber means.

9. An attenuator as recited in claim 1 wherein,
   a. said first chamber means has a passage in an aft wall thereof for expelling the expanding gas rearwardly to a substantial portion of the second chamber means.

10. An attenuator as recited in claim 1 wherein,
    a. said first chamber means inner cylindrical fixed wall means being opposite to said cylindrical flexible wall means, and
    b. a passage in said inner cylindrical fixed wall means for expelling the expanding gas from said first chamber means to said second chamber means.

11. An attenuator of signal pulsation for a seismic pneumatic air gun for generating an initial desired acoustical signal pulse comprising,
    a. an annular chamber having an outer cylindrical flexible wall connected to said air gun and an inner cylindrical fixed wall connected to the air gun for forming an annular chamber around said inner cylindrical fixed wall for receiving expanding air from said air gun for being inflated,
    b. a second chamber having a cylindrical fixed wall integral with said inner cylindrical fixed wall of said first chamber and having a forward portion and an aft portion, and
    c. passage means interconnecting said two chambers for permitting the expanding air to pass from said first chamber into said second chamber for attenuating subsequent signal pulsation following said initial acoustical signal pulse generated by the air gun.

12. An attenuator as recited in claim 11 wherein,
    a. said passage means comprises a plurality of openings between said two chambers to ensure easy passage of expanding air therebetween.

13. An attenuator as recited in claim 11 wherein,
    a. said passage means is responsive to the expanding air from said first chamber for passing air therefrom into said second chamber aft portion whence the air passes to said second chamber forward portion for attenuating subsequent signal pulsation.

14. An attenuation as recited in claim 11, wherein,
    a. said passage means is responsive to the expanding air from said first chamber for passing air therefrom into said second chamber forward portion whence the air passes to said second chamber aft portion for attenuating subsequent signal pulsation.

15. An attenuator as recited in claim 11 wherein,
    a. said first chamber has a passage in an aft wall thereof for expelling the expanding air aft to said second chamber aft portion.

16. An attenuator as recited in claim 11 wherein,
    a. a plurality of passages are formed between said first chamber inner cylindrical fixed wall and said second chamber forward portion for expelling the expanding air from said first chamber to said second chamber.

17. An attenuator as recited in claim 11 wherein,
    a. said second chamber has a vent passage to the atmosphere for lowering the air pressure in both chambers towards atmospheric pressure.

18. An energy source means comprising,
    a. an energy source for generating an initial desired acoustical signal pulse,
    b. first chamber means having a flexible wall means overlying an inner fixed wall means for forming an annular chamber around said fixed wall means for receiving expanding gas from said energy source for being inflated, and
    c. second chamber means having a fixed wall means integral with said first chamber means inner fixed wall means for receiving said expanding gas from said first chamber means for attenuating subsequent signal secondary oscillation.

19. An energy source means as recited in claim 18 wherein,
    a. said second chamber means has a vent passage to the atmosphere for lowering the gas pressure in the chamber means to approach atmospheric pressure.

* * * * *

UNITED STATES PATENT OFFICE
CERTIFICATE OF CORRECTION

Patent No. 3,740,708　　　　　　　　　Dated June 19, 1973

Inventor(s) WILLIAM E. PHILLIPS

It is certified that error appears in the above-identified patent and that said Letters Patent are hereby corrected as shown below:

IN THE DRAWING:

FIGS. 3 and 4, Ref. No. "10a" should be --10c-- and the following Ref. No. -- 20b -- should be added as shown on the drawing.

IN THE SPECIFICATION:

Column 5, line 5, "10a" should be --10c--,

Column 4, line 6, cancel "interconnected" and after "means" insert -- being interconnected and--.

Signed and sealed this 3rd day of September 1974.

(SEAL)
Attest:

McCOY M. GIBSON, JR.　　　　　　　C. MARSHALL DANN
Attesting Officer　　　　　　　　　Commissioner of Patents

UNITED STATES PATENT OFFICE
CERTIFICATE OF CORRECTION

Patent No. 3,740,733                    Dated June 19, 1973

Inventor(s) Allan Chertok

It is certified that error appears in the above-identified patent and that said Letters Patent are hereby corrected as shown below:

In the Specification:

Column 7, line 44, change "$b_{22}$" to -- $b_2$ --

Column 8, line 5, (equation) change "$b_{2-2}$" to -- $b_{n-2}$ --

Column 8, line 25, cancel "and the bus 50 is connected together with the output from the amplifier 40"

Column 8, line 35, insert "input" before -- terminal --

Signed and sealed this 18th day of December 1973.

(SEAL)
Attest:

EDWARD M. FLETCHER, JR.
Attesting Officer

RENE D. TEGTMEYER
Acting Commissioner of Patents